(12) United States Patent
Hatakeyama et al.

(10) Patent No.: US 10,750,093 B2
(45) Date of Patent: Aug. 18, 2020

(54) IMAGE PROCESSING DEVICE AND IMAGE PROCESSING METHOD

(71) Applicants: DENSO TEN Limited, Kobe-shi, Hyogo (JP); TOYOTA JIDOSHA KABUSHIKI KAISHA, Toyota-shi, Aichi-ken (JP)

(72) Inventors: Yukiko Hatakeyama, Kobe (JP); Kouei Kiyo, Kobe (JP); Tamaki Takeuchi, Kobe (JP); Rie Habuta, Kobe (JP); Akinari Motohiro, Kobe (JP); Tomoyuki Sato, Kobe (JP); Kohei Maejima, Nisshin (JP); Atsutoshi Sakaguchi, Toyota (JP); Masahiro Takahashi, Toyota (JP)

(73) Assignees: DENSO TEN Limited, Kobe-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/826,046

(22) Filed: Nov. 29, 2017

(65) Prior Publication Data
US 2018/0191960 A1 Jul. 5, 2018

(30) Foreign Application Priority Data
Jan. 4, 2017 (JP) ................................ 2017-000226

(51) Int. Cl.
*H04N 5/00* (2011.01)
*H04N 5/232* (2006.01)
(Continued)

(52) U.S. Cl.
CPC ....... *H04N 5/23293* (2013.01); *H04N 5/2224* (2013.01); *H04N 5/272* (2013.01);
(Continued)

(58) Field of Classification Search
CPC ... H04N 5/00; H04N 7/00; B60R 1/00; B60R 11/00; G06T 11/60; G06T 11/00
See application file for complete search history.

(56) References Cited

U.S. PATENT DOCUMENTS

| 2002/0094110 A1 | 7/2002 | Okada et al. |
| 2004/0105579 A1 | 6/2004 | Ishii et al. |
| (Continued) | | |

FOREIGN PATENT DOCUMENTS

| DE | 10 2013 016 244 A1 | 4/2015 |
| JP | 2001-315603 A | 11/2001 |
| (Continued) | | |

OTHER PUBLICATIONS

Bayerische Motoren Werke, The BMW 7 Series Owner's Manual, p. 180 (Year: 2015).*

*Primary Examiner* — Maryam A Nasri
(74) *Attorney, Agent, or Firm* — Oliff PLC (57) ABSTRACT

An image processing device according to an embodiment includes an image acquisition unit, an information acquisition unit, a generation unit, and a composition unit. The image acquisition unit acquires a captured image where an image of an environment of a vehicle is captured by an image-capturing device. The information acquisition unit acquires information regarding a detected position of an obstacle that exists in an environment of the vehicle. The generation unit generates a virtual viewpoint image where an environment of the vehicle is viewed from a virtual viewpoint, based on the captured image that is acquired by the image acquisition unit. The composition unit composites a notification image that provides notification of existence of the obstacle at the detected position with the virtual viewpoint image and composites a vehicle image with the virtual viewpoint image.

13 Claims, 7 Drawing Sheets

(51) Int. Cl.
   *H04N 5/272*     (2006.01)
   *H04N 5/222*     (2006.01)
   G01S 13/86       (2006.01)
   G01S 13/931      (2020.01)

(52) U.S. Cl.
   CPC ........... *G01S 13/867* (2013.01); *G01S 13/931* (2013.01); *G01S 2013/9323* (2020.01)

(56) References Cited

U.S. PATENT DOCUMENTS

| | | |
|---|---|---|
| 2008/0205706 A1 | 8/2008 | Hongo |
| 2010/0245573 A1 | 9/2010 | Gomi et al. |
| 2012/0296523 A1 | 11/2012 | Ikeda et al. |
| 2013/0093851 A1* | 4/2013 | Yamamoto ............ G01S 15/931 348/46 |
| 2014/0354813 A1* | 12/2014 | Ishimoto ................ H04N 7/181 348/148 |
| 2017/0305018 A1* | 10/2017 | Machida .................. E02F 9/261 |
| 2018/0044893 A1* | 2/2018 | Machida ................... B60R 1/00 |

FOREIGN PATENT DOCUMENTS

| | | |
|---|---|---|
| JP | 2002-359838 A | 12/2002 |
| JP | 2004-240480 A | 8/2004 |
| JP | 2010-093567 A | 4/2010 |
| JP | 2010-283718 A | 12/2010 |
| JP | 2012-188057 A | 10/2012 |
| JP | 2014-060646 A | 4/2014 |
| JP | 2014-068308 A | 4/2014 |

\* cited by examiner

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2017-000226, filed on Jan. 4, 2017, the entire contents of which are incorporated herein by reference.

FIELD

The embodiment discussed herein is directed to an image processing device and an image processing method.

BACKGROUND

For example, a device has conventionally been known that detects an obstacle that exists in an environment of a vehicle by using a sensor of a radar device or the like and presents a result of detection to a user. For example, in Japanese Laid-open Patent Publication No. 2012-188057, in a case where an obstacle is detected, a detection range of a sensor is superimposed and displayed on a captured image that is captured by a camera.

However, a conventional technique has room for further improvement in that a position of an obstacle is readily recognized.

For example, in a conventional technique as described above, a range capable of detecting an obstacle is merely presented to a user and a position of a detected obstacle, per se, is not presented to such a user. Accordingly, there is a possibility that a user overlooks an obstacle.

SUMMARY

An image processing device according to an embodiment includes an image acquisition unit, an information acquisition unit, a generation unit, and a composition unit. The image acquisition unit acquires a captured image where an image of an environment of a vehicle is captured by an image-capturing device. The information acquisition unit acquires information regarding a detected position of an obstacle that exists in an environment of the vehicle. The generation unit generates a virtual viewpoint image where an environment of the vehicle is viewed from a virtual viewpoint, based on the captured image that is acquired by the image acquisition unit. The composition unit composites a notification image that provides notification of existence of the obstacle at the detected position with the virtual viewpoint image and composites a vehicle image with the virtual viewpoint image.

DESCRIPTION OF EMBODIMENT

Hereinafter, an embodiment of an image processing device and an image processing method as disclosed in the present application will be described in detail, with reference to the accompanying diagrams. Additionally, the present invention is not limited by such an embodiment.

1. Outline of Obstacle Presentation System

Figure 1A:
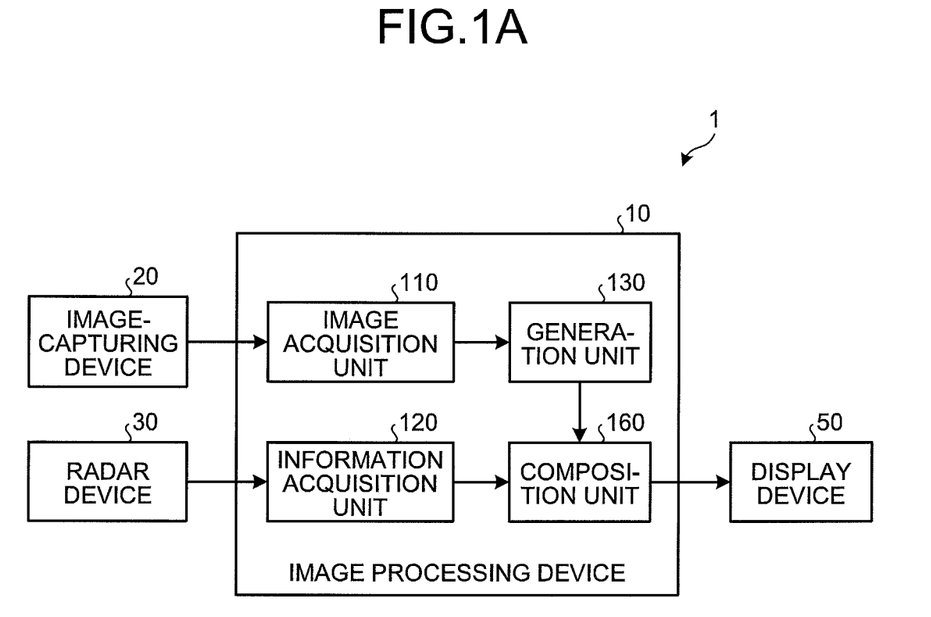
FIG. 1A and FIG. 1B are diagrams illustrating an outline of an obstacle presentation system according to an embodiment.
Figure 1B:
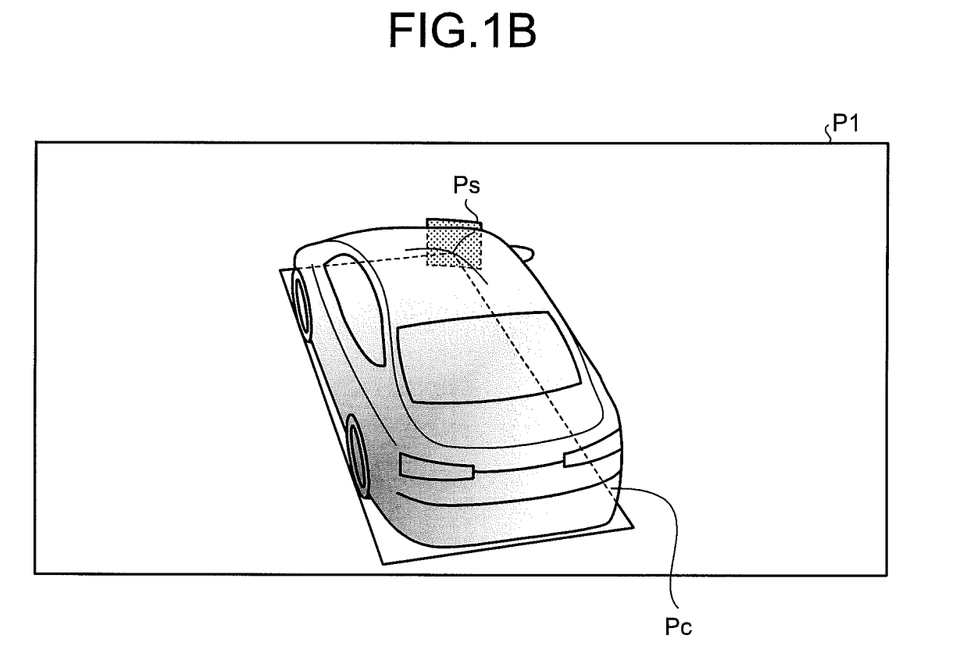

An outline of an obstacle presentation system 1 according to an embodiment will be described by using FIG. 1A and FIG. 1B. FIG. 1A and FIG. 1B are diagrams illustrating an outline of the obstacle presentation system 1 according to an embodiment. The obstacle presentation system 1 is mounted on a vehicle and detects, and presents to a user (driver), an obstacle on a periphery of the vehicle.

The obstacle presentation system 1 generates a virtual viewpoint image where an environment of a vehicle is viewed from a virtual viewpoint, based on a captured image where an image of an periphery of the vehicle is captured by an image-capturing device. The obstacle presentation system 1 composites a notification image that provides notification of existence of an obstacle at a detected position of the obstacle with a virtual viewpoint image and composites a vehicle image therewith to generate a composite image. Additionally, a radar device of the obstacle presentation system 1 detects a position of an obstacle. The obstacle presentation system 1 displays a generated composite image on a display device, so that an obstacle is presented to a user.

Thus, a notification image is composited with a virtual viewpoint image at a position of an obstacle that is detected by a radar device, so that it is possible for a user to readily recognize the obstacle.

The obstacle presentation system 1 includes an image processing device 10, an image-capturing device 20, a radar device 30, and a display device 50.

The image-capturing device 20 has, for example, a plurality of (non-illustrated) cameras that are arranged in an environment of a vehicle. Each camera of the image-capturing device 20 captures an image of a periphery of a vehicle with a constant period of time.

The radar device 30 emits a radio wave on a periphery of a vehicle and receives a reflected wave that is reflected from an obstacle, so that an obstacle that exits on a periphery of the vehicle is detected. Moreover, the radar device 30 detects, for example, a distance from a vehicle to an obstacle (that will be described as positional information of an obstacle below) as a position of the obstacle.

The image processing device 10 executes coordinate transformation of a captured image that is captured by the image-capturing device 20 to generate a virtual viewpoint image that is viewed from a virtual viewpoint. The image processing device 10 generates, and outputs to the display device 50, a composite image where a vehicle image or a notification image is composited with a virtual viewpoint image. The image processing device 10 includes an image acquisition unit 110, an information acquisition unit 120, a generation unit 130, and a composition unit 160.

The image acquisition unit 110 acquires a captured image from the image-capturing device 20. The information acquisition unit 120 acquires positional information of an obstacle from the radar device 30.

The generation unit 130 executes a coordinate transformation process for a captured image that is acquired by the image acquisition unit 110 to generate a virtual viewpoint image where a vehicle is viewed from a virtual viewpoint.

The composition unit 160 composites a vehicle image where an appearance of a vehicle is viewed from a virtual viewpoint with a virtual viewpoint image that is generated by the generation unit 130. Furthermore, the composition unit 160 composites obstacle information that indicates existence of an obstacle with a virtual viewpoint image at a position where the obstacle exists (detected position of an obstacle), based on positional information of the obstacle that is acquired by the information acquisition unit 120. Thus, the composition unit 160 composites a vehicle image and a notification image with a virtual viewpoint image to generate a composite image P1.

FIG. 1B illustrates an example of a composite image P1 that is generated by the composition unit 160. In an example of FIG. 1B, the composition unit 160 composites a vehicle image Pc with a virtual viewpoint image where a vehicle is viewed from an upper side on a diagonally backward left. Furthermore, the composition unit 160 composites therewith a notification image Ps on a right side in front of a vehicle.

As illustrated in FIG. 1B, a notification image Ps is composited with a virtual viewpoint image at a position where an obstacle is detected and a vehicle image Pc is composited therewith, so that it is possible for a user to readily confirm a positional relationship between a vehicle and the obstacle.

Furthermore, a part of a vehicle image Pc is caused to be transparent, so that a notification image Ps is not hidden by the vehicle image Pc and it is possible for a user to confirm a position of an obstacle more readily. Causing a part of a vehicle image Pc to be transparent will be described later by using FIG. 7A, FIG. 7B, and the like.

The display device 50 includes, for example, a display, and displays a composite image P1 that is generated by the composition unit 160. Thereby, it is possible to present an obstacle to a user.

Thus, the image processing device 10 according to an embodiment composites a vehicle image Pc and a notification image Ps with a virtual viewpoint image. Herein, a notification image Ps is composited with a virtual viewpoint image at a position where an obstacle is detected. Thereby, it is possible for a user to readily confirm a position of an obstacle.

2. Details of Obstacle Presentation System

Figure 2:
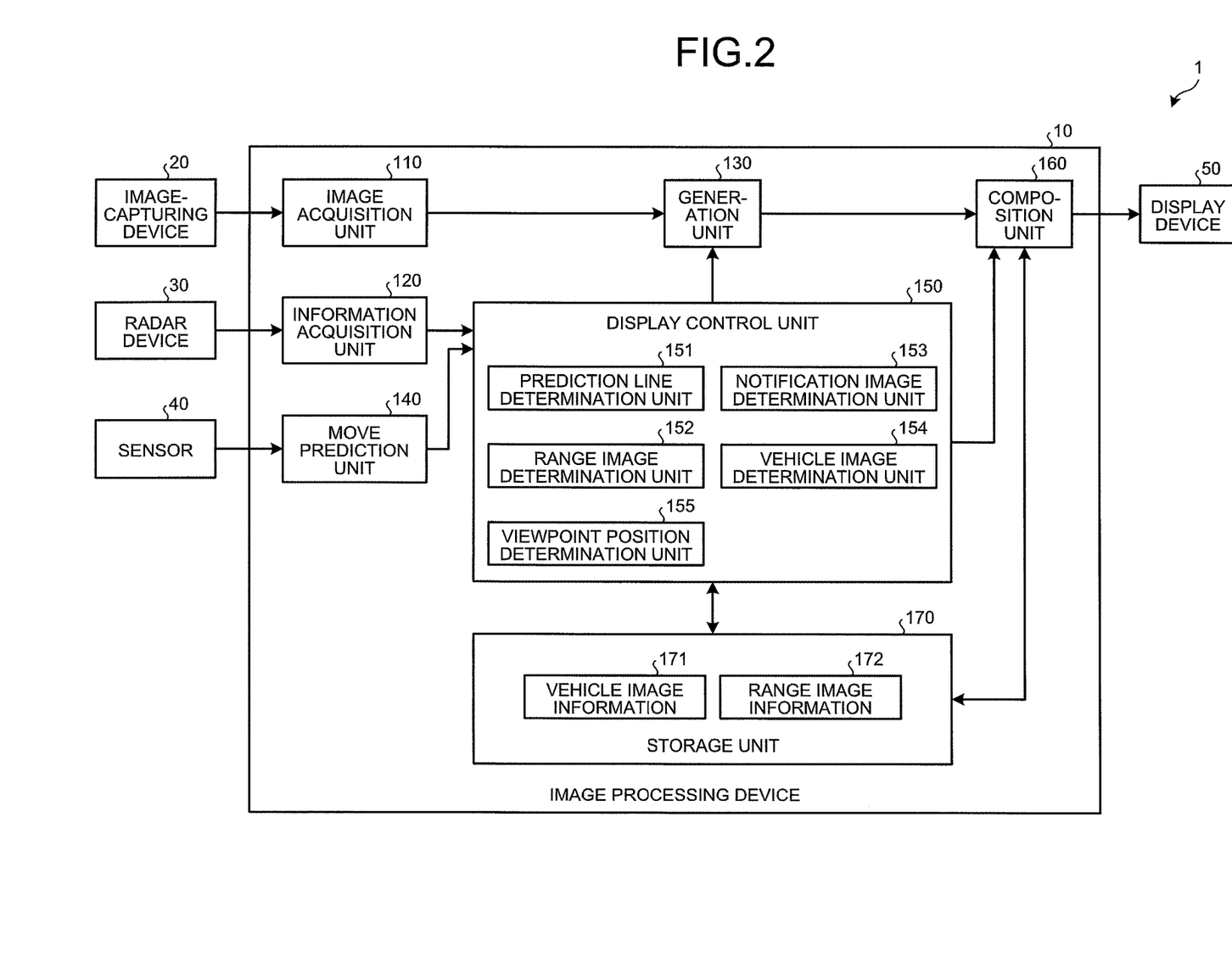
FIG. 2 is a block diagram illustrating a configuration of an obstacle presentation system according to an embodiment.

Next, details of the obstacle presentation system 1 according to an embodiment will be described with reference to FIG. 2 to FIG. 9. FIG. 2 is a block diagram illustrating a configuration of the obstacle presentation system 1 according to an embodiment. Additionally, in FIG. 2, a component needed to describe a feature of an embodiment is represented by a functional block and a description of a general component will be omitted.

In other words, each component as illustrated in FIG. 2 is functionally conceptual and does not have to be physically configured as illustrated in the drawings. For example, a specific configuration of dispersion or integration of respective functional blocks is not limited to that illustrated in the drawings and it is possible to functionally or physically disperse or integrate all or a part thereof in an arbitrary unit to be configured, depending on various types of loads or usage or the like.

As illustrated in FIG. 2, the obstacle presentation system 1 includes an image-capturing device 20, a radar device 30, a sensor 40, an image processing device 10, and a display device 50.

2.1 Image-Capturing Device

The image-capturing device 20 has, for example, a plurality of on-vehicle cameras 20a to 20d with an image-capturing element such as a Charge Coupled Device (CCD) or a Complementary Metal Oxide Semiconductor (CMOS). The image-capturing device 20 outputs captured images that are captured by the on-vehicle cameras 20a to 20d to the image processing device 10.

Figure 3:
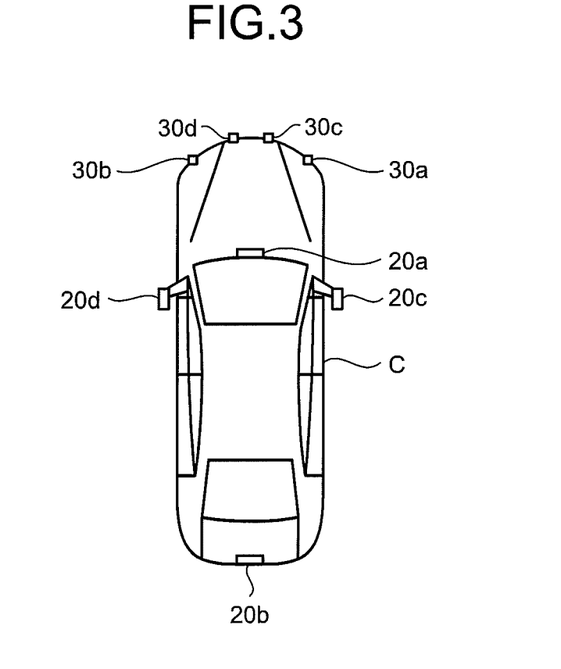
FIG. 3 is a diagram illustrating an example of arrangement of an image-capturing device according to an embodiment.

For example, as illustrated in FIG. 3, the on-vehicle camera 20a is arranged on a front side of a vehicle C and the on-vehicle camera 20b is arranged on a back side of the vehicle C. Furthermore, the on-vehicle camera 20c is arranged on a right side of the vehicle C and the on-vehicle camera 20d is arranged on a left side of the vehicle C. The on-vehicle cameras 20a to 20d execute imaging while respective imaging directions are a front side, a back side, a right side, and a left side of a vehicle. Additionally, FIG. 3 is a diagram illustrating an example of arrangement of the image-capturing device 20.

Furthermore, a wide-angle lens such as a fish-eye lens is adopted for lenses of the on-vehicle cameras 20a to 20d and each of the on-vehicle cameras 20a to 20d has an angle of view that is greater than or equal to 180 degrees. The on-vehicle cameras 20a to 20d are used so that it is possible to execute imaging of an entire periphery of a vehicle C. Additionally, the arrangement or number of the on-vehicle cameras 20a to 20d as illustrated in FIG. 3 is an example and is not limited thereto. As long as it is possible to capture an image of an environment of a vehicle C, the number of on-vehicle cameras may be more or less than four.

2.2 Radar Device

The radar device 30 includes, for example, a plurality of millimeter-wave radars 30a to 30d. The millimeter-wave radars 30a to 30d are arranged on a front side of a vehicle C as illustrated in FIG. 3, and detect an obstacle that exists in front of the vehicle C. The radar device 30 detects positional information such as a distance or an azimuth direction from a vehicle C to an obstacle. The radar device 30 outputs detected positional information to the image processing device 10.

Additionally, the arrangement or number of the radar device 30 as illustrated in FIG. 3 is an example and is not limited thereto. For example, a radar device may also be provided on a back side of a vehicle C to detect an obstacle in back of the vehicle C. Furthermore, the number of millimeter-wave radars that are arranged on a front side of a vehicle C may be more or less than four.

2.3 Image Processing Device

The image processing device 10 as illustrated in FIG. 2 executes coordinate transformation of a captured image that is captured by the image-capturing device 20 to generate a virtual viewpoint image. The image processing device 10 composites a move prediction line of a vehicle C, a vehicle image Pc, a notification image Ps, or the like with a virtual viewpoint image and outputs it to the display device 50.

The image processing device 10 is a microcomputer with a Central Processing Unit (CPU), a storage unit 170, and the like. The image processing device 10 is installed in, for example, an Electric Control Unit (ECU).

A CPU of the image processing device 10 reads and executes, for example, a program that is stored in a ROM, and thereby, functions as an image acquisition unit 110, an information acquisition unit 120, a generation unit 130, a move prediction unit 140, a display control unit 150, and a composition unit 160.

Furthermore, it is also possible to compose at least one or all of the image acquisition unit 110, the information acquisition unit 120, the generation unit 130, the move prediction unit 140, the display control unit 150, and the composition unit 160 of hardware such as an Application Specific Integrated Circuit (ASIC) or a Field Programmable Gate Array (FPGA).

2.3.1 Image Acquisition Unit

The image acquisition unit 110 sequentially acquires a captured image that is captured by the image-capturing device 20. A captured image that is acquired by the image acquisition unit 110 includes captured images that are captured by the on-vehicle cameras 20a to 20d (see FIG. 3) of the image-capturing device 20. The image acquisition unit 110 outputs an acquired captured image to the generation unit 130.

2.3.2 Information Acquisition Unit

The information acquisition unit 120 acquires positional information that includes a detected position of an obstacle that exists on a periphery of a vehicle C from the radar device 30. The information acquisition unit 120 outputs acquired positional information to the display control unit 150.

Additionally, an acquisition source for positional information for the information acquisition unit 120 is not limited to the radar device 30. As long as a position of an obstacle is found, the information acquisition unit 120 may acquire positional information of an obstacle from, for example, a (non-illustrated) detection device that detects such positional information based on an acquired image. Furthermore, the image processing device 10 may detect positional information of an obstacle based on a captured image.

2.3.3 Generation Unit

The generation unit 130 executes a coordinate transformation process for a captured image that is acquired by the image acquisition unit 110, and thereby, generates a virtual viewpoint image where an environment of a vehicle C is viewed from an arbitrary virtual viewpoint. Additionally, such a virtual viewpoint is determined by a viewpoint position determination unit 155 of the display control unit 150 as described later.

For example, the generation unit 130 projects (maps) a captured image onto a predetermined projection surface as a coordinate transformation process, and causes an image of a region that is included in a predetermined viewing angle when viewed from an arbitrary virtual viewpoint, among captured images that have been projected onto the predetermined projection surface, to be a virtual viewpoint image.

For example, the generation unit 130 stores a table that indicates a correspondence relationship between positions of data that are included in a captured image and a position of a predetermined projection surface, and projects the data that are included in a captured image onto the predetermined projection surface at a corresponding position by using such a table.

Such a predetermined projection surface has, for example, a substantially hemispherical shape (for example, a bowl shape), where its central region (for example, a bottom portion of a bowl) is at a position of a vehicle C and an outside of a position of the vehicle C (for example, a portion other than a bottom portion of a bowl) corresponds to a region of an environment of the vehicle C. Additionally, a predetermined projection surface does not have to be a curved surface and may be, for example, a planar surface.

The generation unit 130 outputs a generated virtual viewpoint image to the composition unit 160.

2.3.4 Move Prediction Unit

The move prediction unit 140 predicts a course of move of a vehicle C based on a result of an output of the sensor 40. The move prediction unit 140 predicts a course of move of a vehicle C, for example, in a case where a speed of the vehicle C is less than or equal to a predetermined value. The sensor 40 includes, for example, a steering sensor that detects a steering angle or a shift sensor that detects a shift state.

The move prediction unit 140 predicts a direction of move of a vehicle C based on a shift state. For example, the move prediction unit 140 predicts that a direction of move of a vehicle C is forward, if a shift state of the vehicle C is "Drive".

The move prediction unit 140 predicts an angle of move of a vehicle C based on a steering angle. For example, the move prediction unit 140 predicts an angle of move in a case where a vehicle C starts to move, from a steering angle, a dimension and a turning radius of the vehicle C, or the like.

The move prediction unit 140 predicts a predicted course in a case where a vehicle C starts to move, based on a direction of move and an angle of move that have been predicted. The move prediction unit 140 outputs a predicted course to the display control unit 150.

2.3.5 Display Control Unit

The display control unit 150 determines an image that is composited with a virtual viewpoint image by the composition unit 160, so that a display image that is displayed on the display device 50 is controlled. The display control unit 150 determines that at least one of a move prediction line, a vehicle image Pc, a notification image Ps, and a range image that indicates a detection range of the radar device 30 is composited with a virtual viewpoint image. Furthermore, the display control unit 150 determines a display format of an image to be composited, such as a display color or presence or absence of emphatic display.

The display control unit 150 includes a prediction line determination unit 151, a range image determination unit 152, a notification image determination unit 153, a vehicle image determination unit 154, and a viewpoint position determination unit 155.

In a case where the move prediction unit 140 predicts a prediction course, the prediction line determination unit 151 determines that a move prediction line that indicates a predicted course is composited with a virtual viewpoint image. For example, the move prediction unit 140 is assumed to predict a course where a vehicle C turns left. In such a case, the prediction line determination unit 151 determines that move prediction lines L1 and L2 that extend from a right front wheel and a left rear wheel of a vehicle C are composited with a virtual viewpoint image as illustrated in FIG. 4.

Figure 4:
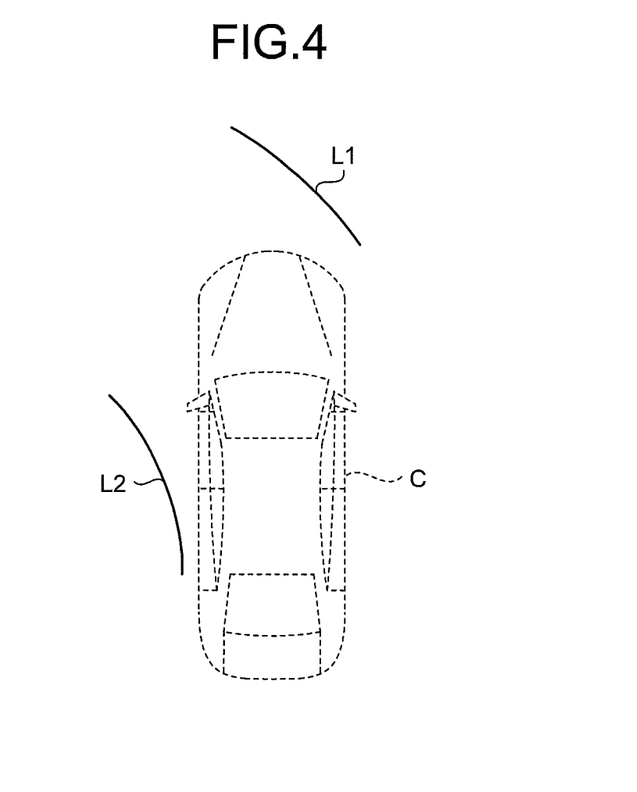
FIG. 4 is a diagram illustrating an example of a move prediction line according to an embodiment.

Additionally, FIG. 4 is a diagram illustrating an example of move prediction lines L1 and L2 according to an embodiment. Furthermore, move prediction lines L1 and L2 as illustrated in FIG. 4 are examples and are not limited thereto. For example, the prediction line determination unit 151 may determine that move prediction lines that extend from left and right front wheels are composited with a virtual viewpoint image.

Figure 5:
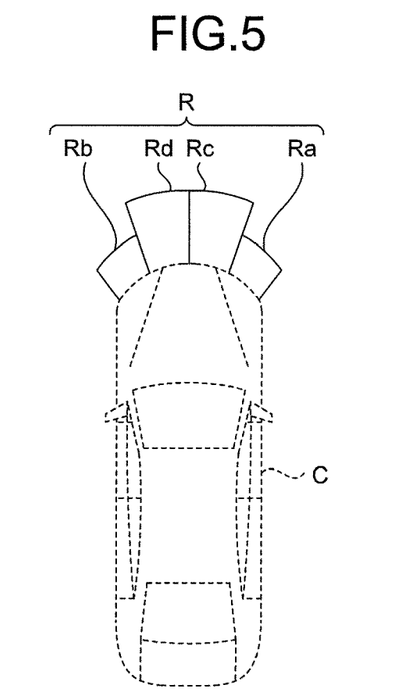
FIG. 5 is a diagram illustrating an example of a range image according to an embodiment.

The range image determination unit 152 determines that a range image R that indicates a detection range of the radar device 30 is displayed on the display device 50. The display control unit 150 displays a detection range of the radar device 30, for example, in such a manner that it is divided into four ranges that are ranges Ra to Rd as illustrated in FIG. 5. Additionally, ranges Ra to Rd correspond to detection ranges of the millimeter wave radars 30a to 30d, respectively.

A range image R as illustrated in FIG. 5 includes a range Ra where a detection range is a right front side of a vehicle C and a range Rb where a detection range is a left front side of the vehicle C. A range image R in FIG. 5 includes a range Rc where a detection range is between ranges Ra and Rb and near the range Ra and a range Rd where a detection range is near the range Rb. Furthermore, detection distances of ranges Rc and Rd are greater than detection distances of ranges Ra and Rb.

Additionally, FIG. 5 is a diagram illustrating an example of a range image R according to an embodiment. A range image R as illustrated in FIG. 5 is a range where a user is notified thereof in a case where the radar device 30 detects an obstacle, and may be different from a range where the radar device 30 is capable of actually detecting the obstacle.

That is, the display control unit 150 notifies a user of an obstacle in a case where such an obstacle is included in ranges Ra to Rd based on positional information that is acquired by the information acquisition unit 120. Such a matter will be described later by using FIG. 6.

Additionally, information regarding a range image R is stored in the storage unit 170 as range image information 172.

Furthermore, as it is determined that a range image R is displayed, the range image determination unit 152 determines a display format of the range image R. For example, the range image determination unit 152 displays boundary lines of ranges Ra to Rd to display a detection range of the radar device 30.

Alternatively, the range image determination unit 152 may display ranges Ra to Rd with a black color having a predetermined transparency and display boundary lines of the ranges Ra to Rd with a white color. Thereby, it is possible for a user to recognize a detection range more readily. Furthermore, as a boundary line is displayed with a white color, a so-called flare-like display where display is executed radially and with a stepwise-lightened color over a predetermined range toward an outside of ranges Ra to Rd may be added thereto. In such a case, a boundary line is emphasized, so that it is possible to determine ranges Ra to Rd more clearly.

Figure 6:
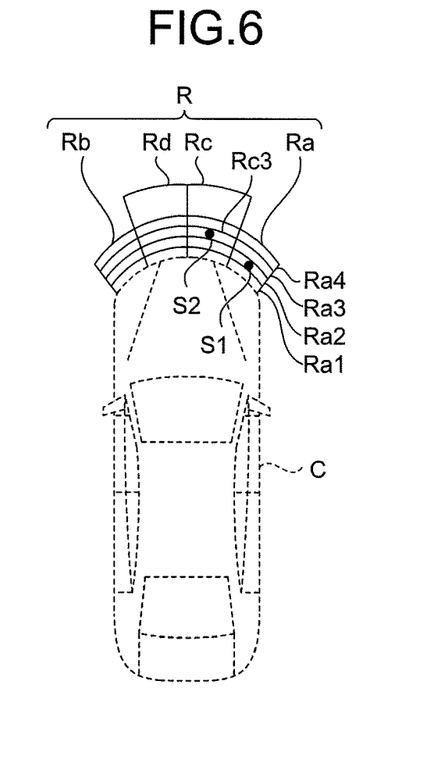
FIG. 6 is a diagram for illustrating an example of a notification image according to an embodiment.

Furthermore, for regions Rc and Rd as illustrated in FIG. 5 and FIG. 6, insides of the regions except outer frame lines may be caused to be transparent. In such a case, it is possible to refer to an obstacle that is superimposed on a region Rc or Rd. Furthermore, gradation from a center to an outer frame line may be applied to a color of frame lines of regions Rc and Rd. In such a case, it is possible to readily refer to an outer range of regions Rc and Rd. Additionally, it is preferable to apply transparency or gradation to, in particular, a part outside ranges Ra and Rb. That is because such a part is readily superimposed on an obstacle.

FIG. 2 is returned to. In a case where the information acquisition unit 120 acquires positional information of an obstacle, that is, in a case where an obstacle exits in an environment of a vehicle C, the notification image determination unit 153 determines that a notification image Ps is displayed on the display device 50.

The notification image determination unit 153 determines that a notification image Ps is displayed at a position where an obstacle exists, on a virtual viewpoint image, based on positional information that is acquired by the information acquisition unit 120.

First, the notification image determination unit 153 determines where an obstacle is positioned in a detection range. Specifically, the notification image determination unit 153 divides ranges Ra to Rd that are included in a detection image into multiple regions and determines which divided region an obstacle exists in. For example, in FIG. 6, a range Ra or Rb is divided into four regions and a range Rc or Rd is divided into five regions. Additionally, FIG. 6 is a diagram for illustrating an example of a notification image Ps according to an embodiment.

Herein, an obstacle is positioned in each of a region Ra2 of a range Ra and a region R3 of a range Rc as illustrated in FIG. 6. Additionally, positions of obstacles are represented by points S1 and S2 in FIG. 6. In such a case, the notification image determination unit 153 determines a region Ra2 and a region R3 as regions for displaying a notification image Ps thereon.

For example, the notification image determination unit 153 determines that a quadrangular plate (surface) with no thickness as a notification image Ps is three-dimensionally composited with a virtual viewpoint image. Herein, the notification image determination unit 153 three-dimensionally displays such a notification image Ps, for example, so as to be perpendicular to a ground surface and face a vehicle C in a region Ra2 or Rc3. Thereby, it is possible for the notification image determination unit 153 to display a notification image Ps that executes notification of existence of an obstacle at a position where the obstacle is detected on a virtual viewpoint image.

Next, the notification image determination unit 153 determines a display format of a notification image Ps based on positional information of an obstacle. For example, the notification image determination unit 153 changes a display color of a notification image Ps depending on a distance between an obstacle and a vehicle C.

For example, as a range Ra in FIG. 6 is described as an example, the notification image determination unit 153 determines a display color of a notification image Ps to be a red color as a high risk in a case where an obstacle exists in a region Ra1 or Ra2 close to a vehicle C among regions Ra1 to Ra4 of the range Ra. Furthermore, the notification image determination unit 153 determines a display color of a notification image Ps to be a yellow color as a low risk in a case where an obstacle exists in a region Ra3 or Ra4 distant from a vehicle C.

Herein, as described above, in a case where obstacles exist in regions Ra2 and Rc3, the notification image determination unit 153 determines a display color of a notification image Ps that is displayed in a region Rc3 to be a yellow color because the region Rc3 is distant from a vehicle C. On the other hand, the notification image determination unit 153 determines a display color of a notification image Ps that is displayed in a region Ra2 to be a red color because the region Ra2 is close to a vehicle C.

Herein, for example, the range image determination unit 152 may determine a display color of a range Ra that includes a region Ra2 to be a red color that is identical to a display color of a notification image Ps. Thereby, it is possible to notify a user of existence of an obstacle at a high risk to increase a degree of attention thereto.

Additionally, a display color of a notification image Ps is herein changed based on a distance of an obstacle, and is not limited thereto. It is sufficient to change a display format of a notification image Ps depending on a distance of an obstacle, that is, a risk thereof. For example, a gray scale of a notification image Ps may be changed based on a distance of an obstacle. In such a case, the notification image determination unit 153 displays a notification image Ps, for example, so as to be diluted with increasing a distance from an obstacle.

Alternatively, a height of a notification image Ps may be changed based on a distance of an obstacle. In such a case, the notification image determination unit 153 causes a height of a notification image Ps (length thereof in a direction perpendicular to a ground surface) to be reduced with increasing a distance from an obstacle.

Furthermore, in a case where a distance of an obstacle is small, the notification image determination unit 153 may blink and display a notification image Ps, display a profile line so as to be thick, etc., so that the notification image Ps is displayed emphatically.

Furthermore, a notification image Ps is herein a quadrangular plate (surface) with no thickness, and a shape of the notification image Ps is not limited thereto. For example, a notification image Ps may be a stereoscopic image that has a predetermined thickness. For example, the notification image determination unit 153 may cause a solid that has a region Ra2 (see FIG. 6) as a bottom surface and a predetermined height to be a notification image Ps. In such a situation, a region Ra2 may be extended within a range where it is possible to determine a detection level better than a bottom surface of an actual region Ra2. Thereby, it is possible to recognize a notification image Ps more readily.

FIG. 2 is returned to. The vehicle image determination unit 154 determines a vehicle image Pc that is composited with a virtual viewpoint image. For example, the vehicle image determination unit 154 determines that a vehicle image Pc that indicates an appearance of a vehicle C is composited with a virtual viewpoint image in a case where the information acquisition unit 120 does not acquire positional information of an obstacle, that is, an obstacle does not exist in an environment of a vehicle C.

A vehicle image Pc that is composited therewith in a case where an obstacle does not exist is an image where a vehicle C is not transparent, and may be, for example, an image that includes a polygon that imitates the vehicle C or a captured image where an image of an appearance of the vehicle C is captured.

On the other hand, the vehicle image determination unit 154 determines that a vehicle image Ps where at least a part of a vehicle C is transparent, in a case where an obstacle exists in an environment of the vehicle C.

Figure 7A:
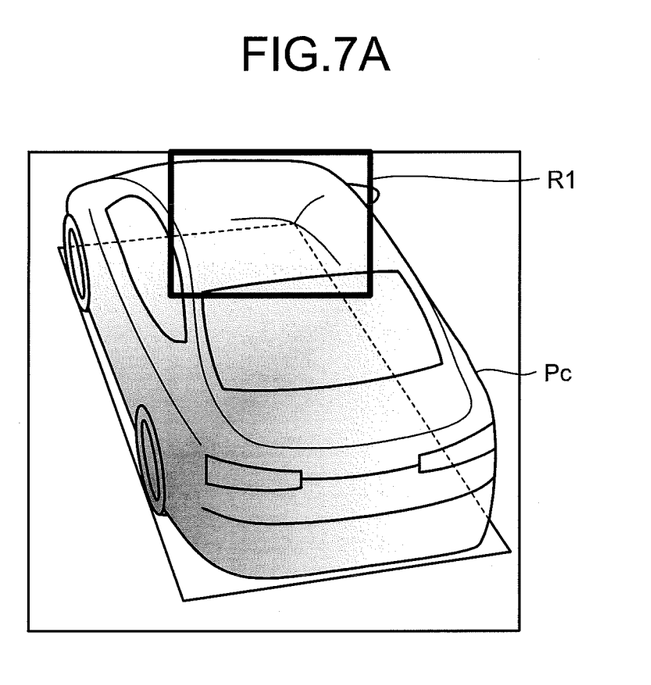
FIG. 7A is a diagram illustrating an example of a vehicle image according to an embodiment.
Figure 7B:
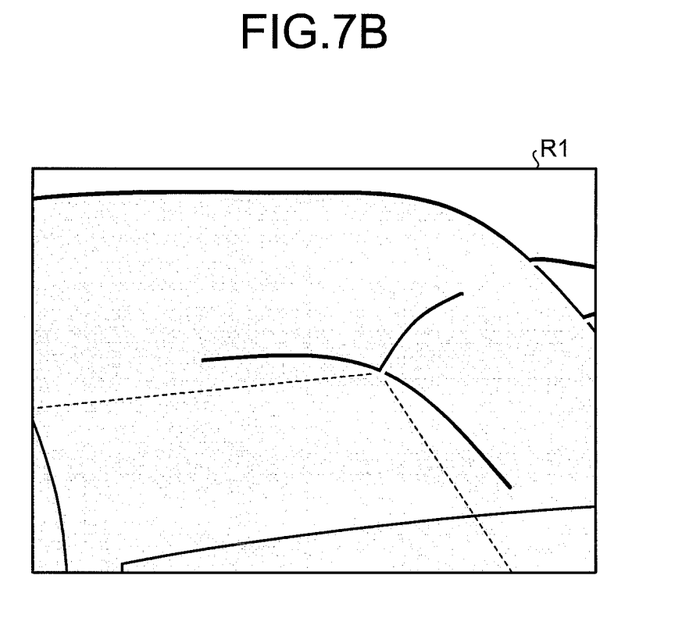
FIG. 7B is an enlarged diagram illustrating a part of a vehicle image as illustrated in FIG. 7A.

A vehicle image Pc that is determined by the vehicle image determination unit 154 will be described by using FIG. 7A and FIG. 7B. FIG. 7A is a diagram illustrating an example of a vehicle image Pc according to an embodiment and FIG. 7B is an enlarged diagram illustrating a part of a vehicle image Pc as illustrated in FIG. 7A.

As illustrated in FIG. 7A, a vehicle image Pc that is composited with a virtual viewpoint image in a case where an obstacle exists is an image where a part thereof is transparent. In FIG. 7A, a front side of a vehicle C has a high transparency so that a background thereof is viewed transparently whereas a transparency is reduced toward a back side of the vehicle C so that the vehicle C is rendered without causing a background to be transparent.

Thus, a part of a vehicle image Pc is caused to be transparent by gradation, so that a notification image Ps is not hidden by the vehicle image Ps even in a case where an obstacle in front of a vehicle C is displayed as such a notification image Ps. Thereby, it is possible for a user to confirm an obstacle more readily independently of a position of a virtual viewpoint, a position of a vehicle image Pc, or the like. Such a matter will be described later by using FIG. 8.

Additionally, even in a case where a part of a vehicle image Pc is caused to be transparent, a profile line of a vehicle C is not caused to be transparent as illustrated in FIG. 7A. Thereby, even in a case where a part of a vehicle image Pc is caused to be transparent, it is possible to readily confirm a back-and-forth relationship between a vehicle C and an obstacle. Such a matter will be described later by using FIG. 8.

Furthermore, a profile line of a vehicle C that is included in a vehicle image Pc is represented by a plurality of lines. For example, as illustrated in FIG. 7B, a profile lime is a two-color line with a light color and a dark color. Additionally, FIG. 7B is an enlarged diagram where a part R1 in FIG. 7A is enlarged.

For example, an auxiliary line with a color dependent on a body color of a vehicle C is added to a profile of a vehicle image Pc, so that it is possible to represent a profile line by a plurality of lines with different brightness. Specifically, for example, in a case where a body color is a light color such as a white color or a gray color, a profile line is drawn by an auxiliary line with a black color. Furthermore, for example, in a case where a body color is a dark color such as blue or black, a profile line is drawn by an auxiliary line with a white color.

Thereby, for example, also in a case where a background color is light like daytime or a case where a background color is dark like night, it is possible for a user to readily recognize a profile line of a vehicle image Pc.

Additionally, a vehicle image Pc as illustrated in FIG. 7A is an example and is not limited thereto. For example, in a case of a vehicle image Pc where a back side of a vehicle C is viewed from a front side thereof, the vehicle image Pc is provided where a back side of the vehicle C is transparent. Thus, the vehicle image determination unit 154 determines a vehicle image Pc where a part where an obstacle overlaps with a vehicle C is transparent, depending on presence or absence of the obstacle and a position of a virtual viewpoint. Additionally, a vehicle image Pc is stored in the storage unit 170 as, for example, vehicle image information 171.

FIG. 2 is returned to. The viewpoint position determination unit 155 determines a virtual viewpoint position of a virtual viewpoint image that is displayed on the display device 50 based on a prediction course from the move prediction unit 140.

For example, in a case where the move prediction unit 140 predicts that a vehicle C turns left, the viewpoint position determination unit 155 determines a virtual viewpoint position above a left back side of a vehicle C. Furthermore, in a case where a vehicle c turns right, the viewpoint position determination unit 155 determines a virtual viewpoint position above a right back side of a vehicle C.

2.3.6. Composition Unit

The composition unit 160 composites move prediction lines L1 and L2 or the like with a virtual viewpoint image that is generated by the generation unit 130 in accordance with determination by the display control unit 150 to generate a composite image. The composition unit 160 generates a composite image dependent on presence or absence of an obstacle.

For example, in a case where an obstacle exits in an environment of a vehicle C, the composition unit 160 composites move prediction lines L1 and L2, a range image R, a notification image Ps, and a vehicle image Pc with a virtual viewpoint image. In such a case, the composition unit 160 first composites move prediction lines L1 and L2, a range image R, and a notification image Ps with a virtual viewpoint image.

For example, in a case where move prediction lines L1 and L2 that are determined by the prediction line determination unit 151 are lines provided by viewing a vehicle C from directly above as illustrated in FIG. 4, the composition unit 160 executes coordinate transformation of move prediction lines L1 and L2 so as to be changed to, and superimpose thereon, move prediction lines L1 and L2 that are viewed from a virtual viewpoint.

Furthermore, the composition unit 160 composites a range image R with a virtual viewpoint image based on, for example, the range image information 172 that is stored in the storage unit 170. Herein, in a case where the range image information 172 that is stored in the storage unit 170 is a detection range that is viewed from directly above (see FIG. 5), the composition unit 160 executes coordinate transformation of the range image information 172 to generate, and superimpose on a virtual viewpoint image, a range image R where the detection range is viewed from a virtual viewpoint. Similarly, the composition unit 160 also transforms a notification image Ps into an image that is viewed from a virtual viewpoint and superimposes it on a virtual viewpoint image.

Additionally, move prediction lines L1 and L2 or the like are herein subjected to coordinate transformation and superimposed on a virtual viewpoint image, and are not limited thereto. For example, in a case where the range image information 172 that is viewed from a virtual viewpoint is preliminarily stored in the storage unit 170, etc., coordinate transformation does not have to be executed.

The composition unit 160 composites move prediction lines L1 and L2 or the like with a virtual viewpoint image, and subsequently, and composites a vehicle image Pc with the virtual viewpoint image due to, for example, chroma key based on the vehicle image information 171 that is stored in the storage unit 170 to generate a composite image. In such a case, the composition unit 160 superimposes a vehicle image Pc where at least a part thereof is transparent on a virtual viewpoint image.

Figure 8:
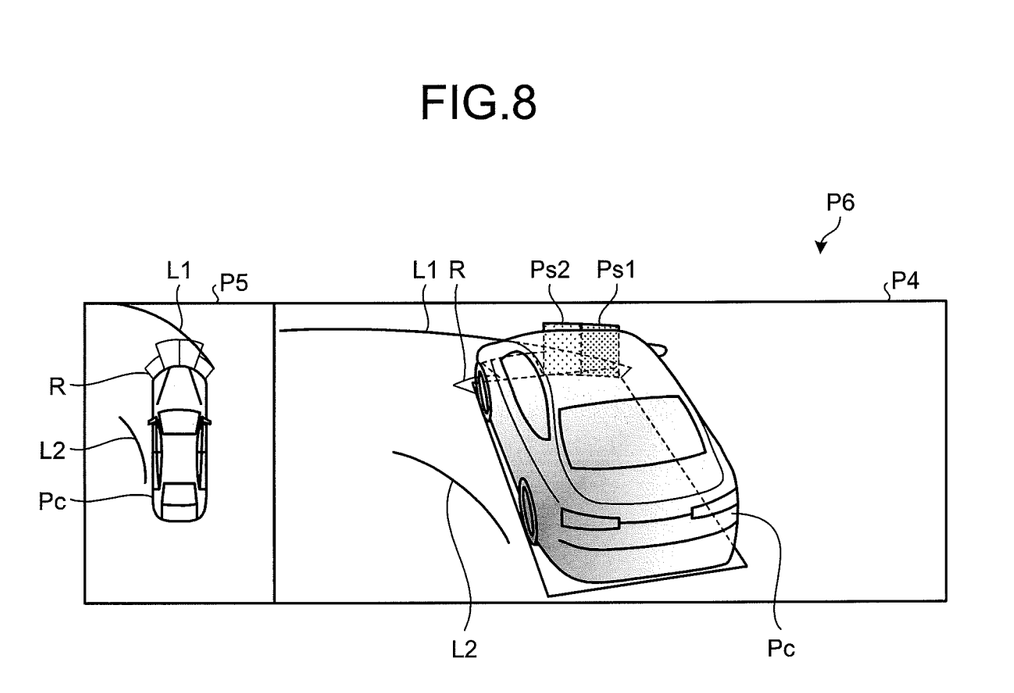
FIG. 8 is a diagram illustrating an example of a composite image that is generated by a composition unit according to an embodiment.

FIG. 8 illustrates an example of a composite image that is generated by the composition unit 160. FIG. 8 is a diagram illustrating an example of a composite image that is generated by the composition unit 160 according to an embodiment. In an example of FIG. 8, the composition unit 160 generates a composite image P4 where a vehicle C is viewed from a diagonally backward left and an overview image P5 where the vehicle C is viewed from directly above. For example, the composition unit 160 outputs a display image P6 where a composite image P4 is composited with an overview image P5 to the display device 50.

As illustrated in FIG. 8, an overview image P5 is composited with a vehicle image Pc, move prediction lines L1 and L2, and a range image R. Herein, two obstacles exist on a right front side of a vehicle C (see FIG. 6). In a range image R that is displayed on an overview image P5, for example, a region Ra2 is filled with a red color and a range Ra is displayed by a red line. Furthermore, for example, a region Rc3 is filled with a yellow color.

Furthermore, as illustrated in FIG. 8, a composite image P4 is composited with a vehicle image Pc, move prediction lines L1 and L2, a range image R, and notification images Ps1 and Ps2. Herein, an obstacle exists on a right front side of a vehicle C, and hence, a vehicle image Pc is superimposed on notification images Ps1 and Ps2, while the vehicle image Pc is transparent, and hence, it is possible for a user to readily confirm the notification images Ps1 and Ps2.

Moreover, in FIG. 8, a part of notification images Ps1 and Ps2 (central region in FIG. 8) is transparent. Thus, at least a part of notification images Ps1 and Ps2 is caused to be transparent, so that it is possible for a user to readily confirm a move prediction line L1. Furthermore, gradation from a center to an outer frame line may be applied to a color of frame lines of a notification images Ps1 and Ps2. In such a case, it is possible to readily refer to an outer range of notification images Ps1 and Ps2. A notification image Ps in FIG. 1B is also similar thereto.

Furthermore, in FIG. 8, notification images Ps1 and Ps2 are represented by surfaces perpendicular to a ground surface. Thus, notification images Ps1 and Ps2 are represented three-dimensionally, so that it is possible for a user to recognize a position of an obstacle more readily.

Herein, as described above, a part of a vehicle image Pc is caused to be transparent but a profile line of the vehicle image Pc is not caused to be transparent. Thereby, it is clear that notification images Ps1 and Ps2 exist in back of a vehicle image Pc, so that it is possible for a user to confirm a positional relationship between an obstacle and a vehicle C more readily.

On the other hand, in a case where an obstacle does not exist on a periphery of a vehicle C, the composition unit 160 composites therewith move prediction lines L1 and L2, a range image R, and a vehicle image Pc to generate a (non-illustrated) composite image. In such a case, the composition unit 160 composites a non-transparent vehicle image Pc with a virtual viewpoint image based on, for example, the vehicle image information 171 in the storage unit 170.

Thus, a transparency of a vehicle image Pc is changed depending on whether or not an obstacle is detected, so that, in a case where an obstacle exists, it is possible to present a positional relationship between the obstacle and a vehicle C to a user.

2.3.7. Storage Unit

FIG. 2 is returned to. The storage unit 170 stores information that is used in a process for each unit of the image processing device 10, such as the vehicle image information 171 or the range image information 172. Furthermore, the storage unit 170 stores a result of a process for each unit.

The storage unit 170 includes, for example, a RAM or an HDD. For example, it is possible for a RAM or an HDD to store information for a various types of programs or the like dependent on a process that is executed by each unit of the image processing device 10. Additionally, the image processing device 10 may acquire information for various types of programs or the like through another computer or a portable recording medium that is connected by a wired or wireless network.

2.4. Display Device

The display device 50 is, for example, a display that is mounted on a vehicle C. The display device 50 displays a display image that is generated by the image processing device 10. For example, in a case where a (non-illustrated) navigation device is mounted on a vehicle C, the display device 50 may be a display that is included in such a navigation device.

3. Image Generation Process

Next, processing steps of an image generation process that is executed by the image processing device 10 according to an embodiment will be described by using FIG. 9.

Figure 9:
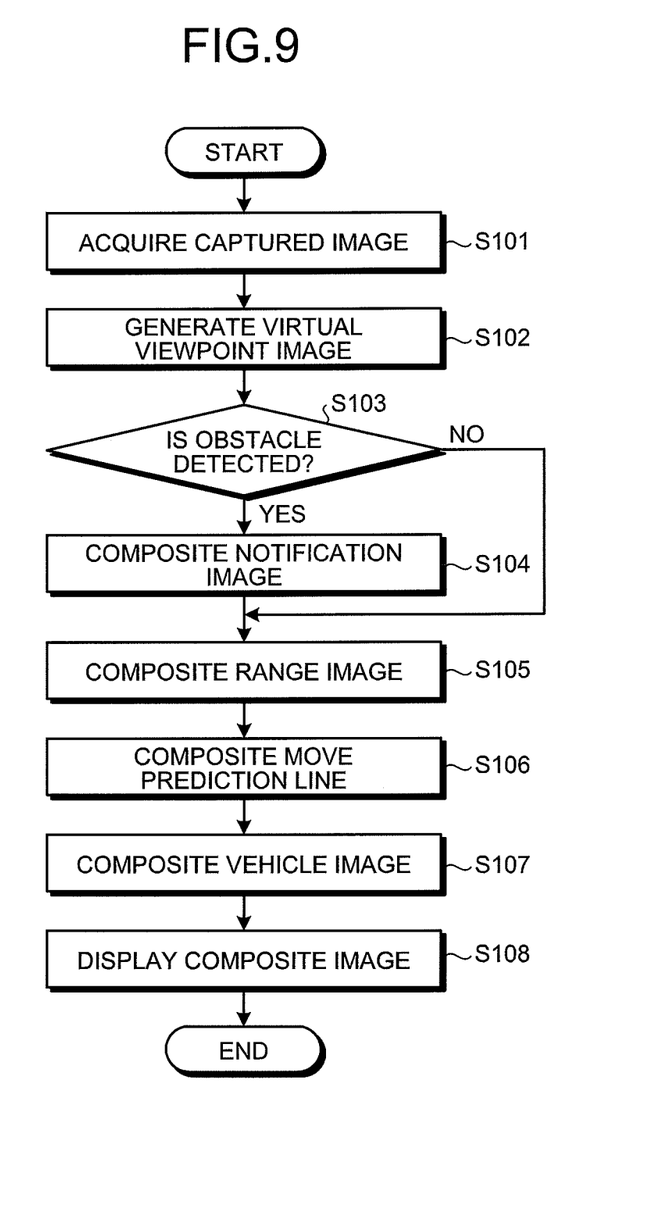
FIG. 9 is a flowchart illustrating processing steps of an image generation process that is executed by an image processing device according to an embodiment.

FIG. 9 is a flowchart illustrating processing steps of an image generation process that is executed by the image processing device 10 according to an embodiment.

The image processing device 10 repeatedly executes an image generation process in FIG. 9, for example, in a case where a vehicle C executes a right turn or a left turn while moving forward at a predetermined speed or less.

The image processing device 10 executes an image generation process in FIG. 9, for example, at a constant interval for the image-capturing device 20 to capture a captured image. Additionally, an interval for the image processing device 10 to execute an image generation process is not limited to such a constant interval. The image processing device 10 may execute an image generation process, for example, every time a plurality of captured images is acquired, that is, with a period of time longer than such a constant interval.

As illustrated in FIG. 9, the image processing device 10 first acquires a captured image from the image-capturing device 20 (step S101). The image processing device 10 generates a virtual viewpoint image based on an acquired captured image (step S102).

Then, the image processing device 10 determines whether or not an obstacle is detected depending on whether or not the information acquisition unit 120 acquires positional information (step S103). In a case where an obstacle is not detected (No at step S103), the image processing device 10 goes to step S105.

On the other hand, in a case where an obstacle is detected (Yes at step S103), the image processing device 10 composites a notification image Ps with a virtual viewpoint image at a detected position of an obstacle (step S104). Subsequently, the image processing device 10 composites a range image R with a virtual viewpoint image (step S105) and composites move prediction lines L1 and L2 therewith (step S106).

The image processing device 10 composites a vehicle image Pc with a virtual viewpoint image to generate a composite image (step S107). The image processing device 10 displays a generated composite image on the display device 50 (step S108).

Additionally, as long as the image processing device 10 composites therewith at least one of a notification image Ps, a range image R, and move prediction lines L1 and L2 depending on presence or absence of an obstacle, orders of processes at step S104 to step S106 may be changed or they may be omitted.

As described above, the obstacle presentation system 1 according to an embodiment displays, on the display device 50, s composite image where a vehicle image Pc and a notification image Ps are composited with a virtual viewpoint image. Herein, a notification image Ps is composited with a virtual viewpoint image at a position where an obstacle is detected, so that it is possible for a user to readily confirm a position of the obstacle.

4. Effect

The image processing device 10 according to the above-mentioned embodiment includes the image acquisition unit 110, the information acquisition unit 120, the generation unit 130, and the composition unit 160. The image acquisition unit 110 acquires a captured image where an image of an environment of a vehicle C is captured by the image-capturing device 20. The information acquisition unit 120 acquires information regarding a detected position of an obstacle that exists in an environment of the vehicle C. The generation unit 130 generates a virtual viewpoint image where an environment of the vehicle C is viewed from a virtual viewpoint, based on the captured image that is acquired by the image acquisition unit 110. The composition unit 160 composites a notification image Ps that provides notification of existence of the obstacle at the detected position with the virtual viewpoint image and composites a vehicle image Pc with the virtual viewpoint image.

Thereby, it is possible for a user to recognize an obstacle more readily.

The composition unit 160 of the image processing device 10 according to the above-mentioned embodiment causes at least a part of the notification image Ps to be transparent and composites it with the virtual viewpoint image.

Thereby, even in a case where a notification image Ps is superimposed on and displayed with a move prediction line L1 or L2 or the like, it is possible for a user to recognize a move prediction line L1 or L2 or the like more readily.

The composition unit 160 of the image processing device 10 according to the above-mentioned embodiment composites therewith the vehicle image Pc where at least a part of the vehicle C therein is transparent.

Thereby, even in a case where a vehicle image Pc is superimposed on and displayed with a notification image Ps, it is possible for a user to recognize an obstacle more readily.

The composition unit 160 of the image processing device 10 according to the above-mentioned embodiment composites therewith the vehicle image Pc where a profile line therein is not transparent.

Thereby, even in a case where a vehicle image Pc is superimposed on and displayed with a notification image Ps, which is displayed on a near side is readily recognized, so that it is possible to recognize a positional relationship between a vehicle C and an obstacle more readily.

The composition unit 160 of the image processing device 10 according to the above-mentioned embodiment composites therewith the vehicle image Pc that is rendered with a plurality of profile lines with different brightness.

Thereby, it is possible for a user to readily recognize a profile line of a vehicle image Pc independently of a background color of a virtual viewpoint image.

The composition unit 160 of the image processing device 10 according to the above-mentioned embodiment composites therewith the notification image Ps that is three-dimensionally displayed.

Thereby, it is possible to recognize a notification image Ps stereoscopically, so that it is possible to recognize a positional relationship between a vehicle C and an obstacle more readily.

The information acquisition unit 120 of the image processing device 10 according to the above-mentioned embodiment acquires the information regarding the detected position from a detection device (radar device 30) that detects the obstacle. The composition unit 160 composites a range image R that indicates a detection range of the detection device (radar device 30) with the virtual viewpoint image.

Thereby, it is possible for a user to recognize a detection range of a detection device, so that it is possible to readily confirm whether or not an obstacle is detected.

The composition unit 160 of the image processing device 10 according to the above-mentioned embodiment displays an outer frame of a range image R that indicates the detection range in a flare-like shape and composites it with the virtual viewpoint image.

Thereby, it is possible for a user to recognize a detection range of a detection device more readily.

The generation unit 130 of the image processing device 10 according to the above-mentioned embodiment generates the virtual viewpoint image where the vehicle C is viewed from an upper side in back of the vehicle C.

Thereby, even in a case where a user executes confirmation for involvement, it is possible to present a detected obstacle to a user.

The image processing device 10 according to the above-mentioned embodiment further includes the display control unit 150 that controls the composition unit 160 in such a manner that the notification image Ps is emphatically displayed depending on the detected position.

Thereby, in a case where an obstacle is close to a vehicle C and is at a high risk, it is possible to present an obstacle to a user more reliably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising a processor programmed to:
    acquire a captured image where an image of an environment of a vehicle is captured by an image-capturing device mounted on the vehicle, the image-capturing device including an image sensor;
    acquire, from a detection device mounted on the vehicle, information regarding a detected position of an obstacle that exists in an environment of the vehicle;
    generate a virtual viewpoint image where an environment of the vehicle is viewed from a virtual viewpoint, based on the acquired captured image;
    composite a notification image that provides notification of existence of the obstacle at the detected position with the virtual viewpoint image and composite a vehicle image with the virtual viewpoint image; and
    composite the vehicle image with the virtual viewpoint image composited with the notification image, while overlapping the vehicle image and the notification image with each other, to form a composited vehicle image, where (i) at least a part of an overlapped part in the composited vehicle image between the vehicle and the obstacle is transparent, (ii) the vehicle and the notification overlap each other in the composited vehicle image, and (iii) in the overlapped part of the composited vehicle image, the vehicle image is transparent in order to not hide the notification image so that the notification image is viewed through the transparent vehicle image,
    wherein acquiring the information regarding the detected position of the obstacle that exists in the environment of the vehicle includes (i) segmenting a detection range in the environment into a plurality of regions defined by intersecting longitudinal areas and latitudinal areas, (ii) determining the longitudinal area where the obstacle exists in the detection range, (iii) determining the latitudinal area where the obstacle exists in the detection range, and (iv) identifying a target region where the obstacle exists in the detection range based on where the determined longitudinal area and the determined latitudinal area intersect.

2. The image processing device according to claim 1, wherein the processor is further programmed to cause at least a part of the notification image to be transparent and composite it with the virtual viewpoint image.

3. The image processing device according to claim 1, wherein the detection range includes at least four longitudinal areas, at least four latitudinal areas and at least sixteen target regions.

4. The image processing device according to claim 1, wherein the processor is further programmed to composite therewith the vehicle image where a profile line therein is not transparent.

5. The image processing device according to claim 1, wherein the processor is further programmed to composite therewith the vehicle image that is rendered with a plurality of profile lines with different brightness.

6. The image processing device according to claim 1, wherein the processor is further programmed to composite therewith the notification image that is three-dimensionally displayed.

7. The image processing device according to claim 1, wherein the processor is further programmed to:
    acquire the information regarding the detected position from the detection device that detects the obstacle; and
    composite a range image that indicates the detection range of the detection device with the virtual viewpoint image.

8. The image processing device according to claim 7, wherein the processor is further programmed to display an outer frame of a range image that indicates the detection range in a flare-like shape and composite it with the virtual viewpoint image.

9. The image processing device according to claim 1, wherein the processor is further programmed to generate the virtual viewpoint image where the vehicle is viewed from an upper side in back of the vehicle.

10. The image processing device according to claim 1, wherein the processor is further programmed to emphatically display the notification image depending on the detected position.

11. An image processing device comprising a processor programmed to:
    acquire a captured image where an image of an environment of a passenger car is captured by an image-capturing device mounted on the passenger-car, the image-capturing device including an image sensor;
    generate a virtual viewpoint image where an environment of the passenger car is viewed from a virtual viewpoint, based on the acquired captured image; and
    composite a passenger-car image with the virtual viewpoint image and a notification image to form a composited passenger-car image, where (i) at least a part of the passenger car therein is transparent with the virtual viewpoint image, (ii) the passenger-car and the notification overlap each other in the composited passenger-car image, and (iii) in a part of the composited passenger-car image where the passenger-car and the notification overlap each other, the passenger-car image is transparent in order to not hide the notification image so that the notification image is viewed through the transparent passenger-car image,
    wherein compositing the passenger-car image with the virtual viewpoint image and the notification image includes (i) acquiring information regarding a detected position of an obstacle that exists in an environment of the passenger-car, (ii) segmenting a detection range in the environment into a plurality of regions defined by intersecting longitudinal areas and latitudinal areas, (iii) determining the longitudinal area where the obstacle exists in the detection range, (iv) determining the latitudinal area where the obstacle exists in the detection range, and (v) identifying a target region where the obstacle exists in the detection range based on where the determined longitudinal area and the determined latitudinal area intersect.

12. The image processing device according to claim 11, wherein the processor is further programmed to composite the vehicle image where a profile line therein is not transparent with the virtual viewpoint image.

13. An image processing method comprising:
acquiring a captured image where an image of an environment of a vehicle is captured by an image-capturing device mounted on the vehicle, the image-capturing device including an image sensor;
acquiring, from a detection device mounted on the vehicle, information regarding a detected position of an obstacle that exists in an environment of the vehicle;
generating a virtual viewpoint image where an environment of the vehicle is viewed from a virtual viewpoint, based on the acquired captured image;
compositing a notification image that provides notification of existence of the obstacle at the detected position with the virtual viewpoint image and compositing a vehicle image with the virtual viewpoint image; and
compositing the vehicle image with the virtual viewpoint image composited with the notification image, while overlapping the vehicle image and the notification image with each other, to form a composited vehicle image, where (i) at least a part of an overlapped part in the composited vehicle image between the vehicle and the obstacle is transparent, (ii) the vehicle and the notification overlap each other in the composited vehicle image, and (iii) in the overlapped part of the composited vehicle image, the vehicle image is transparent in order to not hide the notification image so that the notification image is viewed through the transparent vehicle image,
wherein acquiring the information regarding the detected position of the obstacle that exists in the environment of the vehicle includes (i) segmenting a detection range in the environment into a plurality of regions defined by intersecting longitudinal areas and latitudinal areas, (ii) determining the longitudinal area where the obstacle exists in the detection range, (iii) determining the latitudinal area where the obstacle exists in the detection range, and (iv) identifying a target region where the obstacle exists in the detection range based on where the determined longitudinal area and the determined latitudinal area intersect.

* * * * *